US012309206B2

(12) United States Patent
Peterson

(10) Patent No.: US 12,309,206 B2
(45) Date of Patent: May 20, 2025

(54) SYSTEM AND METHOD FOR CREATING ACCESS CONTROL POLICIES FOR INDIVIDUAL USERS, USER GROUPS, NETWORK HOST OR NETWORK HOST GROUPS THROUGH NETWORK TRAFFIC ANALYSIS

(71) Applicant: Ericom Software Ltd., Jerusalem (IL)

(72) Inventor: John Peterson, Morgan Hll, CA (US)

(73) Assignee: ERICOM SOFTWARE LTD., Jerusalem (IL)

( * ) Notice: Subject to any disclaimer, the term of this patent is extended or adjusted under 35 U.S.C. 154(b) by 256 days.

(21) Appl. No.: 17/396,895

(22) Filed: Aug. 9, 2021

(65) Prior Publication Data

US 2022/0046063 A1 Feb. 10, 2022

Related U.S. Application Data

(60) Provisional application No. 63/063,357, filed on Aug. 9, 2020.

(51) Int. Cl.
*H04L 9/40* (2022.01)

(52) U.S. Cl.
CPC .......... *H04L 63/205* (2013.01); *H04L 63/102* (2013.01); *H04L 63/1425* (2013.01)

(58) Field of Classification Search
CPC . H04L 63/205; H04L 63/102; H04L 63/1425; H04L 63/0227; H04L 63/1408; H04L 63/20
See application file for complete search history.

(56) References Cited

U.S. PATENT DOCUMENTS

| 9,413,778 | B1 * | 8/2016 | Elisha | H04L 63/1425 |
| 10,263,868 | B1 * | 4/2019 | Baldi | H04W 12/02 |
| 2012/0167168 | A1 * | 6/2012 | Orr | H04L 63/1441 726/1 |
| 2018/0084012 | A1 * | 3/2018 | Joseph | H04L 63/108 |
| 2018/0227184 | A1 * | 8/2018 | Mentze | H04L 41/0894 |
| 2018/0288063 | A1 * | 10/2018 | Koottayi | G06F 21/50 |
| 2020/0228404 | A1 * | 7/2020 | Hooda | H04L 41/0893 |
| 2021/0006542 | A1 * | 1/2021 | Myneni | H04L 63/20 |
| 2021/0037061 | A1 * | 2/2021 | Trost | H04L 63/1425 |
| 2021/0243604 | A1 * | 8/2021 | Lepp | H04W 12/084 |
| 2021/0306354 | A1 * | 9/2021 | Raghuramu | G06N 20/00 |

FOREIGN PATENT DOCUMENTS

WO WO-2019172762 A1 * 9/2019 ......... H04L 63/0236

OTHER PUBLICATIONS

R. Droms, "Automated configuration of TCP/IP with DHCP," in IEEE Internet Computing, vol. 3, No. 4, pp. 45-53, Jul.-Aug. 1999, doi: 10.1109/4236.780960. (Year: 1999).*

* cited by examiner

*Primary Examiner* — Robert B Leung
(74) *Attorney, Agent, or Firm* — Rivka Friedman

(57) ABSTRACT

A method and system for automatically creating access control policies for a network, including: (a) automatically identifying and recording user or host entities that attach to the network; (b) monitoring allowed network communications from the user or host entities; (c) correlating network address information from the allowed network communications with names of the user or host entities; and (d) proposing a respective access control policy for each of the user or host entities based on information gleaned during a learning process.

4 Claims, 2 Drawing Sheets

SYSTEM AND METHOD FOR CREATING ACCESS CONTROL POLICIES FOR INDIVIDUAL USERS, USER GROUPS, NETWORK HOST OR NETWORK HOST GROUPS THROUGH NETWORK TRAFFIC ANALYSIS

This patent application claims the benefit of, and priority from, U.S. Provisional Patent Application No. 63/063,357, filed Aug. 9, 2020, which is incorporated in its entirety as if fully set forth herein.

FIELD OF THE INVENTION

The present invention relates to computer network security and, more particularly, to the automatic creation of access control policies for individual users, user groups, individual network host or network host groups after a computer system performs computer network traffic analysis of allowed communications between other entities on a computer network during a period of machine learning.

BACKGROUND OF THE INVENTION

As organizations continue to strengthen their security posture of their computer networks and implement zero trust access security controls, there is a need to isolate computer networks and applications in order to mitigate the spread of malicious software and prevent users & hackers from reaching systems and applications that they are not authorized to access.

Traditionally, computer networks adopted a castle and moat type of model, where security controls were placed at the perimeter of a local area network. These security controls typically consisted of network firewalls, intrusion prevention systems and virtual private network gateways. The architecture assumed that things on the outside of the network (the castle) were deemed untrusted and things on the inside of the network were deemed trusted. The security layer at the perimeter (the moat) would commonly provide remote access into the network through virtual private network technologies, which granted a level of trust for those endpoints by virtually placing them on the inside of the network. Once remote endpoints would authenticate and connect to the VPN gateway function of a Firewall, the Firewall would enforce policies that would allow these remote users access to either the totality of the local area network or specific resources within the network.

Because organizations would have dozens, hundreds or thousands of remote users connecting into the network remotely, the creation of firewall rules for each individual user became an impossible task. Not only would a security administrator have to create thousands of policies manually by hand, but the security administrator would also have to find out from application administrators what users needed access to particular applications. This made things impossible and/or time consuming. This resulted in organizations realizing that the only way to provide security controls for their remote users (on the outside of the castle) was to either provide access to all applications & hosts on the network or place users inside user groups and create group level security policies to restrict their access. This model has existed for decades but never provided the granular access restriction that is needed in today's movement to a Zero Trust Access architecture.

Remote access into the network is not the only challenge. Devices such as desktop computers, laptops, smartphones, or tablets on the inside of the network also present a challenge to the old castle and moat model. Modern day devices are more mobile than historic computing devices that were once tethered to a physical desk. The model of trusting things on the local area network or things that authenticate to gain entry into the local area network no longer works. With the rise of computer mobility, and users frequently moving in and out of the local area network with mobile devices, comes the increased risk that a mobile device may have become compromised or infected outside of the network (the castle). If this were to occur an infected device that gains entry across the security perimeter (the moat) or walks right into the building could further the spread of a computer infection to other devices or applications that those mobile devices are allowed to communicate with.

Because of these challenges, the industry has begun its movement to a Zero Trust Access model, where users and devices are only allowed to communicate with things they need to communicate with, after they have gone through checks to become a trusted entity. This new model is commonly referred to as a default deny model vs. the historic default allow model. The new model makes sense, however the challenge of implementing Zero Trust Access security controls still exists. Organizations still struggle with how to create policies for individual users and has reverted to what they are familiar with and that is providing full access or group level access.

Full access clearly creates a scenario of over-privileged access, and group level access may create over-privileged access to certain users within the group. Imagine a group of one hundred users and one user within that group may not need access to the same things that the other ninety-nine users in the group need access to. The only way to truly get Zero Trust is to implement policy on a per user or host basis. But the question of how to identify all of the applications a user needs access to and how to create those individual rules when the user population may be well into the thousands, has still gone unanswered.

SUMMARY OF THE INVENTION

According to the present invention there is provided a method for automatically creating access control policies for a network, including: (a) automatically identifying and recording user or host entities that attach to the network; (b) monitoring allowed network communications from the user or host entities; (c) correlating network address information from the allowed network communications with names of the user or host entities; and (d) proposing a respective access control policy for each of the user or host entities based on information gleaned during a learning process.

According to further features in preferred embodiments of the invention described below the learning process includes at least one of: (i) performing network traffic analysis on network traffic to and from the user or host entities; (ii) performing behavior analysis on the user or host entities; and (iii) performing machine learning on activities of the user or host entities.

According to still further features in the described preferred embodiments the respective access control policy for each of the entities is reviewed by a human security administrator or automatically implemented.

According to still further features the user or host entities are selected from the group including: users, user groups, network hosts or network host groups.

According to another embodiment there is provided a system for automatically creating access control policies for a network, including: (a) an Access Controller that is configured to perform a learning process on user or host entities on the network and propose the access control policies based on the learning process; and (b) an Access Isolator that enforces the access control policies by allowing or denying network traffic as instructed by the Access Controller.

According to still further features the Access Isolator has a Network Traffic Monitoring mode, wherein in the Network Traffic Monitoring mode the Access Isolator is further configured to perform monitoring on the network traffic and send monitoring data to the Access Controller. According to still further features the monitoring includes at least one of: deep packet inspection and extracting metadata from network packets.

According to still further features the learning process includes at least one of: (i) network traffic analysis of network traffic to and from the user or host entities; (ii) behavior analysis of the user or host entities; and (iii) machine learning of activities of the user or host entities.

According to still further features the Access Controller includes an Event Listener Engine configured to capture attachment event details when the user or host entities attach or detach from the network.

According to still further features the Access Controller includes an Enrichment Engine configured to add contextual information to information collected during the learning process.

According to still further features the Access Controller includes an Analytics Engine configured to perform analytical calculations on information collected during the learning process.

According to still further features the Access Controller includes a Correlation Engine configured to determine network addresses of the user or host entities and associate all network traffic flows thereof to correlated user or host names.

According to still further features the Access Controller includes a User Host Name System Engine adapted to dynamically add and remove the user or host names and the network addresses to and from a database whenever an attachment or detachment event occurs on the network.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Preferred embodiments of the invention provide a method for a computer system to automatically create access control policies per user, user group, network host or group of network hosts automatically. The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

This approach negates the need for a security administrator to have to manually create access control policies that could potentially be in the thousands. It also negates the need for the administrator to have to inquire with people throughout the organization on what applications users or hosts should be allowed to access to.

The system that performs the tasks stated above of automatically creating access control policies may be a software or a hardware solution. The solution first automatically identifies and records users, user groups, network hosts or network host groups that attach to the network and stores this discovered information. Once the system has completed this task, the solution will then proceed in monitoring allowed network communications from these entities. Once this task is completed, the system should then proceed by correlating network address information such as an IP address, with the user name, network host name, user group name or network host group name. Upon completion of these tasks, the solution should then perform network traffic analysis, user & entity behavior analysis and machine learning for the purpose of proposing an access control policy for a human security administrator to review or the system may automatically implement the policies without review.

The principles and operation of a method and system according to the present invention may be better understood with reference to the drawings and the accompanying description.

Figure 1:
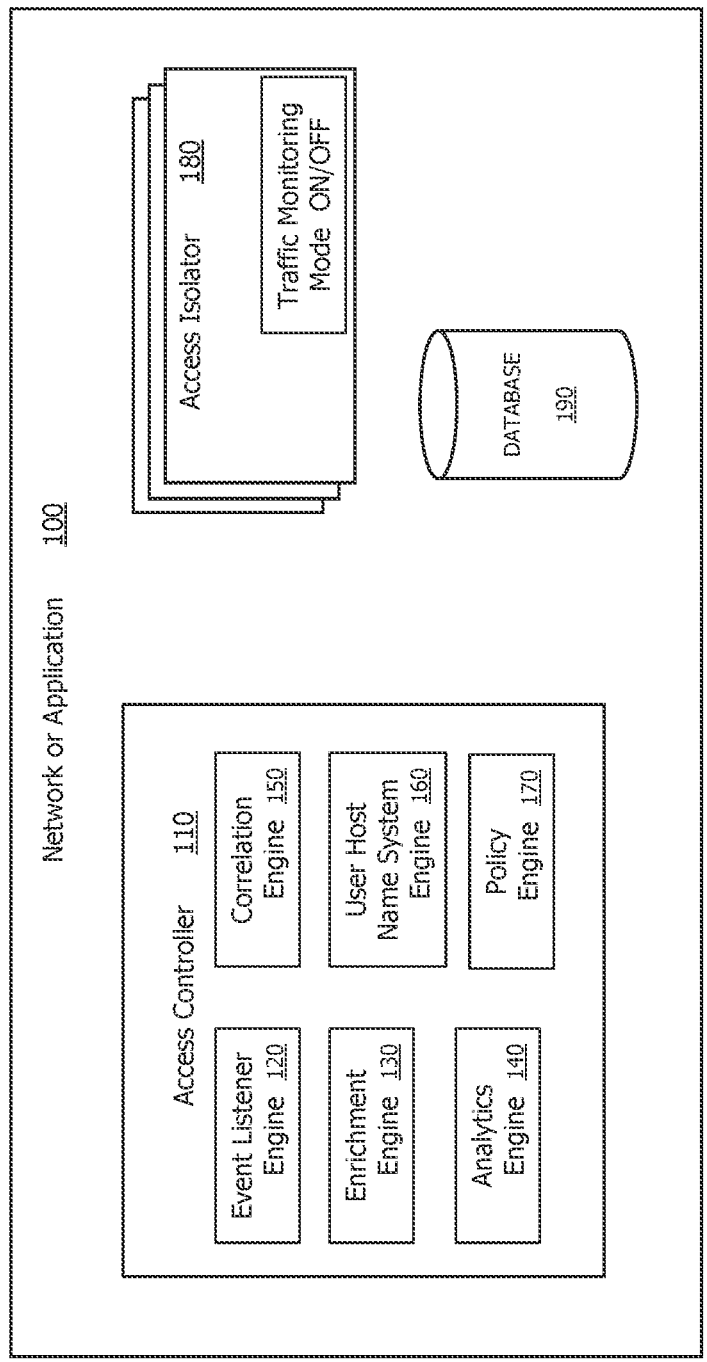
FIG. 1 is a high-level block diagram of the system components.

Referring now to the drawings, FIG. 1 illustrates a high-level block diagram of the system components. Only components that are germane to the innovation are represented. It is made clear that one skilled in the art would understand how to employ the instant system within a network or application based on the description detailed herein.

The innovative system can be implemented in a Network or Application 100 as hardware, software and/or firmware. Innovatively, the system primarily includes two main components that are referred to herein as an Access Controller 110 and Access Isolator 180.

As a quick, simplified overview of an exemplary implementation of the innovative process for performing the tasks of the present innovation can be described in, but are in no way limited to, ten general steps performed by Access Controller 110 and Access Isolator 180. A detailed description of the components of the system will be discussed hereafter and a detailed, exemplary process flow will be detailed after that.

The exemplary, non-limiting steps include:
1. Capture new user or host presence events (i.e., authentication, DHCP Requests, Traffic Broadcasts, etc.).
2. Identify the network address of the user or host.
3. Check for the existing presence of old access control policies for user or host.

4. Remove stale or orphaned access control policies for said user or host if necessary.
5. Lookup authorization policies that dictate what parts of the network to enable network analysis and machine learning.
6. Check to see if learning mode is enabled.
7. If learning mode is enabled, perform policy learning.
8. Store learned policies and present policies to the administrator for manual review or automatically install policies within the system.
9. Dynamically install learned policies on enforcement engines throughout the network when a user or host attaches to the network.
10. Enforce policies by allowing or denying traffic to protected entities within the network.

A detailed description of the system components follows hereafter.

Access Controller

The Access Controller 110 is considered the brain of the solution and is a component that collects data, enriches data, stores data and performs analytics on the data for the purpose of proposing an access control policy in which the Access Isolators 180 will use to enforce traffic flows.

Access Isolator

The Access Isolators 180 are considered the muscle of the solution as they enforce traffic flows by allowing or denying traffic as instructed by the Access Controller. The Access Isolator may also be instructed to enter into Network Traffic Monitoring mode by the Access Controller and when in this mode, performs deep packet inspection and extracts metadata from network packets and sends this data to the Access Controller for data collection, enrichment and analytics.

Access Controller Engines

EVENT LISTENER ENGINE 120—Within the Access Control, there are multiple micro-components that perform a variety of tasks. One of significant components within the Access Controller is the Event Listener Engine 120. The event listener receives user and host attachment to the network events. For example, a user may VPN into a Firewall/VPN Gateway or login to an Active Directory Controller or a host may request an IP address from a DHCP server when it attaches to a network. When these events occur, the Event Listener captures this information via the SYSLOG protocol, API calls to or from the authentication and access process within the network or a variety of other methods. Once the Event Listener captures this information, it then processes the information for the extraction of relevant information that it needs to begin its learning process.

ENRICHMENT ENGINE 130—The Access Controller engine also has the ability to enrich the data with other bits of relevant information by passing the data along to an Enrichment Engine that can take information that it receives and add other information that gives the original information more context. An example could be the process of taking an IP address and adding geographic location data to the dataset to tell the system where the connection is coming from (e.g., San Francisco California). Another example could be taking user name and finding out how long the user has been an employee of the company. Enriching the data gives more context to the originating data so that it can be used to inform the learning and behavioral analytics process with relevant information needed in making its policy decisions. An example of this relevancy could be that a new employee may have a higher risk of insider data theft than an employee that has been with the company for 20 years. Another example of this relevancy could be that a connection coming from a geographic location that the company has no business with (for example, North Korea) could also pose a higher risk.

ANALYTICS ENGINE 140—The Access Controller may perform numerous analytical calculations on the newly enriched data set to determine if a user should actually have access to a network application or host. This Analytics Engine 140 may look at the time of day that a user or host accesses an application, the number of times a user or host accesses an application during the learning period, the amount of data transferred to an application or the duration of the connection to an application. These are just examples of the analytical process that the system may use in determining if a user should have access to an application after the learning process.

CORRELATION ENGINE 150—The Access Controller may also take advantage of a Correlation Engine 150. This is one of the most important engines in the system and is critical to the novelty of this engine. The correlation engine, when used within this framework, will determine the network address that a user or host has at any given moment and then associate all network traffic flows to a user or host name. When a user attaches to a network, the user may have a different network address each time. Network Traffic Analyzers look at network packets and the network protocols that exist on networks such as TCP/IP have no knowledge of a user name and only have knowledge of numerical address assignments. So, if a network traffic analyzer sees an IP address of 10.1.1.1 and that IP address accesses an application, how is the system to know that 10.1.1.1 is in use by user John Peterson and that the user name John Peterson accessed the application? The correlation engine helps solve the problem by first identifying the IP address that was assigned to the user during a network attachment event (i.e., logon to a VPN device or Active Director Controller) and then storing the user name and the IP address in use in a database such as, but not limited to a DNS (Domain Name System) database.

USER HOST NAME SYSTEM ENGINE 160—This engine helps the previous correlation engine by dynamically adding and removing user names and IP addresses to and from a database 190 whenever a network attachment or detachment event (i.e. logon or logoff) occurs. Once this occurs, all systems that support the query methodology, such as but not limited to DNS, can translate an IP address into a name, vs. translating a name to an IP address. This system is used in this framework to help the network traffic analyzer associate names to its traffic flow records. This is the opposite of how DNS is traditionally used. DNS is traditionally used to find the IP address associated with a name, like www.google.com returns an IP address of 8.8.8.8. In this reverse scenario, a user name of John Peterson may return a result of 10.1.1.1. The benefit of this is to inform the analytics engines on what users or hosts are accessing applications when their network addresses may change each time they connect to the network.

ACCESS CONTROL POLICY ENGINE 170—All of the gathered data, enrichment, analytics, machine learning is fed into the Policy Engine 170 which outputs a proposal for an Access Control Policy for the user/host entity. As mentioned elsewhere, the policy may be presented to a human administrator for approval or may be automatically implemented without approval.

Figure 2:
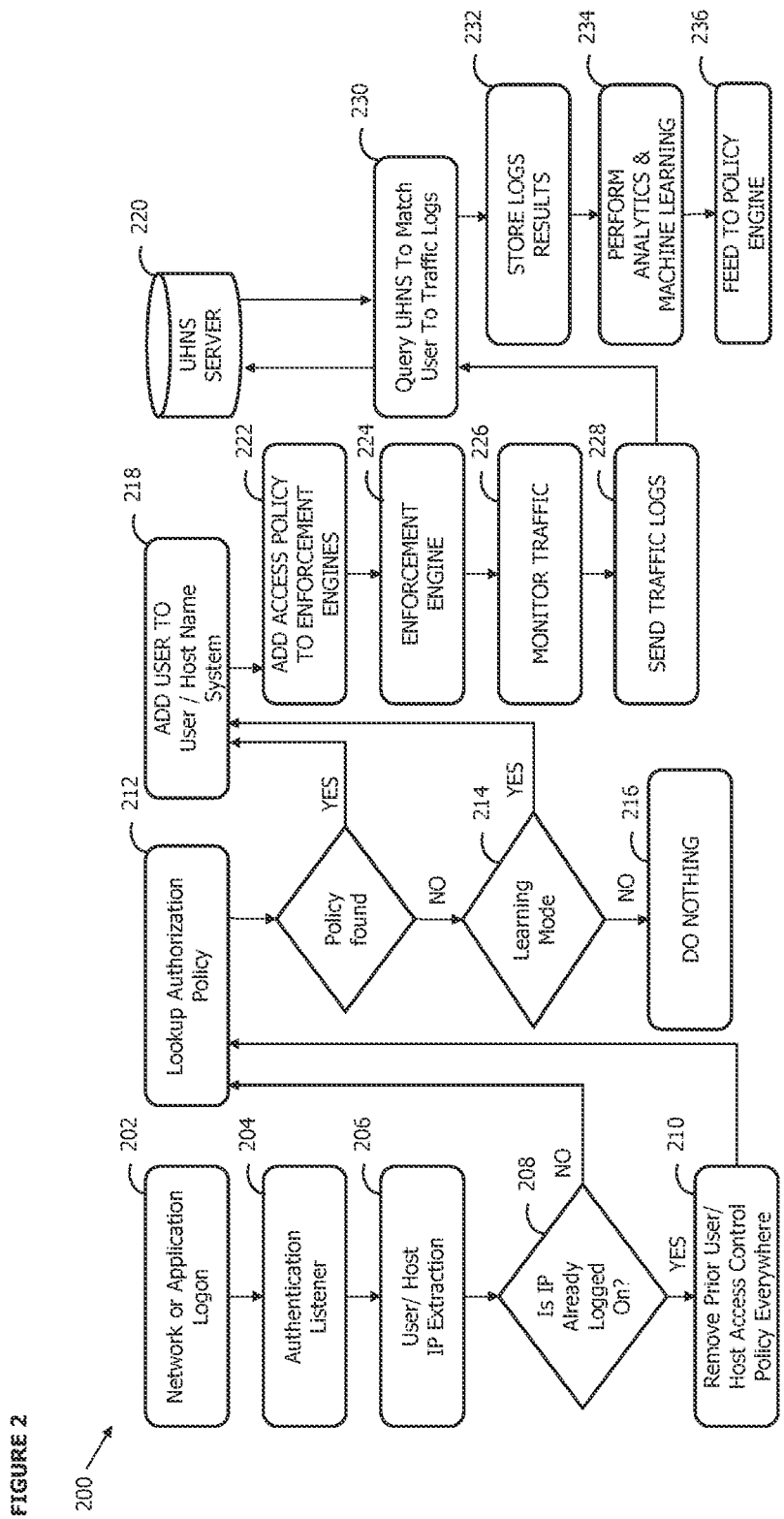
FIG. 2 is a flow diagram of an exemplary implementation of the innovative system and method.

FIG. 2 illustrates a flow diagram of an exemplary implementation of the innovative system and method. At 202 of flow diagram 200, a user or host entity logs onto the network or application (attachment event). At step 204 an Authentication Listener (i.e., the Event Listener Engine of the Access Controller) receives the logon event. The next step in the process, step 206, is to extract the IP address of the user or host entity that logged onto the network or application. As detailed above, the authentication/event listener engine captures the attachment event details (e.g., via the SYSLOG protocol, via API calls to or from the authentication and access process within the network or from any of a variety of other methods). From this captured information, the event listener engine processes the information for the extraction of relevant information that it needs to begin its learning process.

An IP address is usually randomly assigned to the user or host entity when it logs onto the network. These addresses are often recycled once the user/host is no longer logged onto the system. However, the access control policy is assigned by IP address, which can lead to a new user inheriting access controls from a policy that was not meant for the new user but rather for the previous user of the IP address, that has now logged off the network. The IP address and/or other information is extracted from the captured logon information.

Accordingly, at step 208, the system is queried to ascertain whether the extracted IP is already logged onto the network. I.e., the system is asking whether this IP address was previously assigned an access control policy on the network, a policy that was not erased from the policy database. If the IP is already logged on, then in step 210 the system removes the prior user/host access control policy throughout the network. The process then proceeds to step 212.

At step 212 the system has either confirmed that the IP address was not already logged on, or that the previous access control policy for the IP address was erased. If the user or host has a dedicated IP/network address, then the user/host is automatically correlated to the known user/host name. However, very often, as mentioned above, a user/host is assigned a random network address when they attach to the network. The Correlation Engine must now match up the new user/host that has a random (often recycled) network address with a known user/host name. The system already "knows" an existing user/host name and may have a partial or complete access control policy for that name.

Step 212 entails looking up the authorization policy of the user or host that has now logged onto the network/application. If the policy is not found, then, at step 214, check to see if the learning mode is enabled. If the learning mode is not enabled, then, at step 216, do nothing. If the learning mode is enabled at step 214, then the system performs policy learning. Learned policies may be automatically installed or may be presented to an administrator for manual review prior to installation.

If a policy already exists, or the policy has been learned and manually or automatically approved, then the user/host is added or correlated to the corresponding user name, at step 218. The correlation may be one-to-one, e.g., a user to a (stored) user name Alternatively, the user/host may fit the criteria of a group and therefore be added to that group name, e.g., a host may be added to a host group name. The user name and corresponding IP address are added by the User Host Name System (UHNS) Engine to the UHNS server 220. When the user/host logs off the network (detachment event), the UHNS Engine removes the user name and IP address from the database in the UHNS server 220.

At step 222 the system dynamically installs the access control policy to the enforcement engines throughout the system. At step 224 the enforcement engines enforce policies by allowing or denying traffic to protected entities within the network. The Access Isolators discussed above are the enforcement engines referred to here.

Also as detailed above, the Access Isolators may be instructed to enter into Network Traffic Monitoring mode by the Access Controller. If so instructed, in step 226 the Access Isolators, in the Network Traffic Monitoring mode, perform deep packet inspection and extract metadata from network packets. At step 228, the Access Isolators send this data to the Access Controller for data collection, enrichment and analytics. In some cases, the traffic logs may be sent to the Access Controller without inspection of the packets or extraction of metadata.

At step 230, the system queries the UHNS server in order to match the user to traffic logs. At step 232 the system stores the results of the matching step 230. In step 234 the Access Controller performs analytics and Machine Learning. To this end, the Access Controller may pass the data along to the Analytics Engine and/or Enrichment Engine detailed above.

In step 236, the analytics and machine learning data (as well as any other relevant data that may have been generated) is fed to a policy engine.

It should be understood that the steps included in flow 200 either in its entirety, any individual step, series of steps, or set of steps could be repeated, performed in any order, or simultaneously performed according to one embodiment of the present disclosure.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

Further, the each term "comprising," "including," "having," "with," and "containing" is inclusive or open-ended and does not exclude additional, unrecited elements or method steps.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for automatically creating access control policies for a network, comprising:
   (a) automatically identifying and recording user or host entities that attach to the network, each of the user or host entities being assigned respective network addresses;
   (b) monitoring allowed network communications from said user or host entities to extract the respective network addresses;

(c) removing any existing access control policies previously assigned to the network addresses;
(d) correlating the respective network addresses with corresponding existing access control policies of said user or host entities based on said allowed network communications;
(e) performing a learning process, on user or host entities for which no existing access control policies exist; and
(f) proposing a respective access control policy for each of said user or host entities based on information gleaned during the learning process.

2. The method of claim 1, wherein said learning process includes at least one of:
   (i) performing network traffic analysis on network traffic to and from said user or host entities;
   (ii) performing behavior analysis on said user or host entities; and
   (iii) performing machine learning on activities of said user or host entities.

3. The method of claim 1, wherein said respective access control policy for each of said entities is reviewed by a human security administrator or automatically implemented.

4. The method of claim 1, wherein said user or host entities are selected from groups including: users, user groups, network hosts or network host groups.

* * * * *